(12) United States Patent
Sekiguchi et al.

(10) Patent No.: US 8,789,997 B2
(45) Date of Patent: Jul. 29, 2014

(54) LIGHT GUIDE PLATE, SURFACE LIGHT SOURCE DEVICE, AND TRANSMISSION IMAGE DISPLAY DEVICE

(75) Inventors: Yasuhiro Sekiguchi, Niihama (JP); Kentarou Hyakuta, Niihama (JP); Norihisa Teranishi, Fukui (JP); Syuuji Kadoya, Fukui (JP)

(73) Assignees: Sumitomo Chemical Company, Limited, Tokyo (JP); Seiren Co., Ltd., Fukui (JP)

( * ) Notice: Subject to any disclaimer, the term of this patent is extended or adjusted under 35 U.S.C. 154(b) by 71 days.

(21) Appl. No.: 13/336,528

(22) Filed: Dec. 23, 2011

(65) Prior Publication Data

US 2012/0163019 A1     Jun. 28, 2012

(30) Foreign Application Priority Data

Dec. 28, 2010  (JP) ................................ P2010-293287

(51) Int. Cl.
  *G02F 1/1335* (2006.01)
  *F21V 7/04* (2006.01)
  *G09F 13/04* (2006.01)
  *G09F 13/08* (2006.01)

(52) U.S. Cl.
  USPC .......... 362/624; 362/623; 362/625; 362/97.1; 349/65

(58) Field of Classification Search
  USPC ................... 362/623–626; 349/61–63, 65
  See application file for complete search history.

(56) References Cited

U.S. PATENT DOCUMENTS

| | | | | |
|---|---|---|---|---|
| 5,134,549 A * | 7/1992 | Yokoyama | ..................... | 362/623 |
| 5,178,447 A * | 1/1993 | Murase et al. | ................ | 362/621 |
| 5,394,308 A * | 2/1995 | Watanabe et al. | ............ | 362/613 |
| 5,733,710 A | 3/1998 | Kuboya et al. | | |
| 5,921,651 A * | 7/1999 | Ishikawa | ....................... | 362/624 |
| 6,099,134 A * | 8/2000 | Taniguchi et al. | ............ | 362/618 |
| 6,943,857 B2 * | 9/2005 | Tsubokura et al. | ........... | 349/112 |

(Continued)

FOREIGN PATENT DOCUMENTS

| | | | |
|---|---|---|---|
| JP | 06-167602 A | 6/1994 | |
| JP | 08-202298 A | 8/1996 | |

(Continued)

OTHER PUBLICATIONS

Search Report issued Apr. 24, 2012 in PL Application No. P.397502.

(Continued)

*Primary Examiner* — Peggy Neils
*Assistant Examiner* — Erin Kryukova
(74) *Attorney, Agent, or Firm* — Panitch Schwarze Belisario & Nadel LLP

(57) ABSTRACT

A light guide plate according to an embodiment of the present invention is one in which light scattering dots are formed on at least one surface 12c of a light guide substrate 12. A plurality of light scattering dots 24 are formed in each of individual areas A1-A10 resulting from division of the at least one surface 12c of the light guide substrate 12 into a plurality of areas. In each of individual areas A1-A5 where a contrast ratio by the light scattering dots 24 is not more than 50%, the light scattering dots 24 include light scattering dots 24a, 24b of two or more sizes and the light scattering dots 24a, 24b of two or more sizes are arranged in an irregular order.

6 Claims, 15 Drawing Sheets

(56) References Cited

U.S. PATENT DOCUMENTS

| | | | |
|---|---|---|---|
| 7,490,970 B2 * | 2/2009 | Liao | 362/624 |
| 2003/0098834 A1 | 5/2003 | Ide et al. | |
| 2008/0310184 A1 * | 12/2008 | Katsumata | 362/600 |
| 2010/0128464 A1 * | 5/2010 | Joo et al. | 362/97.1 |
| 2011/0304065 A1 | 12/2011 | Wang | |

FOREIGN PATENT DOCUMENTS

| | | |
|---|---|---|
| JP | 2001-014920 A | 1/2001 |
| JP | 2002-040414 A | 2/2002 |
| JP | 2002-343122 A | 11/2002 |
| JP | 2003-066208 A | 3/2003 |
| JP | 2004-228018 A | 8/2004 |
| JP | 2004-240294 A | 8/2004 |
| JP | 2007-011075 A | 1/2007 |
| JP | 2008-027609 A | 2/2008 |
| JP | 2008-270223 A | 11/2008 |
| JP | 2008-311090 A | 12/2008 |
| JP | 2009-224076 A | 10/2009 |
| JP | 4528887 B1 | 8/2010 |
| JP | 2010-205417 A | 9/2010 |
| KR | 2002-0020127 A | 3/2002 |
| TW | 201120532 A | 6/2011 |

OTHER PUBLICATIONS

Office Action issued Aug. 2, 2012 in KR Application No. 10-2011-143099.

Office Action issued Mar. 12, 2013 in JP Application No. 2011-280301.

Office Action issued May 7, 2013 in JP Application No. 2011-280301.

* cited by examiner

Fig.3

| 1 | 1 | 2 | 2 | 2 |
|---|---|---|---|---|
| 2 | 2 | 2 | 2 | 1 | 2 |
| 1 | 2 | 2 | 1 | 2 | 2 |
| 2 | 1 | 2 | 1 | 2 | 2 |
| 2 | 2 | 2 | 1 | 2 | 2 |
| 1 | 2 | 2 | 2 | 2 | 1 |

Fig.4

| 2 | 2 | 2 | 1 | 2 | 2 |
|---|---|---|---|---|---|
| 2 | 1 | 2 | 2 | 2 | 2 |
| 1 | 1 | 2 | 2 | 2 | 1 |
| 2 | 2 | 1 | 2 | 1 | 2 |
| 2 | 1 | 2 | 2 | 2 | 2 |
| 1 | 2 | 1 | 2 | 2 | 2 |

*Fig.5*

| 6 | 6 | 6 | 6 | 6 | 6 |
|---|---|---|---|---|---|
| 7 | 6 | 6 | 6 | 6 | 7 |
| 6 | 6 | 7 | 7 | 6 | 6 |
| 6 | 7 | 6 | 6 | 6 | 7 |
| 7 | 6 | 7 | 6 | 6 | 6 |
| 6 | 6 | 6 | 6 | 6 | 6 |

Fig.6

| 7 | 6 | 6 | 6 | 6 | 6 |
|---|---|---|---|---|---|
| 6 | 6 | 6 | 6 | 7 | 7 |
| 7 | 6 | 6 | 6 | 6 | 6 |
| 6 | 7 | 6 | 7 | 6 | 6 |
| 6 | 6 | 6 | 6 | 6 | 6 |
| 6 | 6 | 6 | 7 | 6 | 6 |

*Fig.7*

| 3 | 3 | 3 | 4 | 3 | 3 | 3 | 3 | 3 | 3 | 4 | 4 | 3 | 3 | 3 | 3 | 3 | 4 |
|---|---|---|---|---|---|---|---|---|---|---|---|---|---|---|---|---|---|
| 3 | 3 | 3 | 3 | 3 | 3 | 3 | 3 | 4 | 3 | 3 | 3 | 3 | 3 | 4 | 3 | 3 | 3 |
| 3 | 4 | 3 | 3 | 3 | 4 | 3 | 3 | 3 | 3 | 3 | 3 | 3 | 4 | 3 | 3 | 3 | 3 |
| 3 | 3 | 4 | 3 | 4 | 3 | 3 | 3 | 3 | 3 | 3 | 3 | 4 | 3 | 3 | 3 | 4 | 4 |
| 3 | 4 | 3 | 3 | 3 | 3 | 4 | 3 | 3 | 4 | 3 | 3 | 3 | 3 | 3 | 3 | 3 | 3 |
| 3 | 3 | 4 | 4 | 3 | 3 | 3 | 3 | 3 | 3 | 3 | 4 | 4 | 3 | 3 | 3 | 3 | 3 |
| 4 | 3 | 3 | 3 | 4 | 3 | 3 | 3 | 3 | 3 | 3 | 4 | 3 | 4 | 3 | 3 | 3 | 3 |
| 3 | 3 | 3 | 3 | 3 | 4 | 3 | 3 | 4 | 3 | 3 | 3 | 3 | 4 | 3 | 3 | 3 | 3 |
| 3 | 3 | 3 | 3 | 3 | 3 | 3 | 3 | 3 | 3 | 3 | 3 | 4 | 3 | 3 | 4 | 3 | 3 |
| 3 | 3 | 3 | 3 | 3 | 4 | 4 | 3 | 4 | 3 | 3 | 3 | 3 | 3 | 3 | 3 | 3 | 3 |
| 3 | 3 | 4 | 3 | 3 | 3 | 3 | 3 | 3 | 3 | 4 | 4 | 3 | 4 | 3 | 4 | 3 | 3 |
| 3 | 3 | 3 | 3 | 3 | 3 | 3 | 3 | 3 | 3 | 3 | 3 | 3 | 3 | 3 | 3 | 3 | 3 |
| 3 | 3 | 3 | 3 | 3 | 3 | 3 | 4 | 3 | 3 | 3 | 3 | 3 | 3 | 4 | 3 | 4 | 3 |
| 3 | 3 | 3 | 3 | 3 | 4 | 3 | 3 | 4 | 3 | 3 | 3 | 3 | 3 | 3 | 3 | 3 | 3 |
| 3 | 3 | 3 | 3 | 3 | 3 | 3 | 4 | 3 | 3 | 3 | 3 | 3 | 3 | 3 | 3 | 3 | 4 |
| 3 | 3 | 3 | 4 | 3 | 3 | 4 | 3 | 3 | 3 | 3 | 3 | 3 | 3 | 3 | 3 | 3 | 3 |
| 3 | 3 | 3 | 3 | 4 | 4 | 4 | 3 | 3 | 4 | 3 | 3 | 4 | 3 | 3 | 4 | 4 | 3 |
| 3 | 3 | 3 | 3 | 3 | 3 | 3 | 3 | 3 | 3 | 3 | 3 | 3 | 3 | 4 | 3 | 3 | 3 |

Fig.8

| 3 | 3 | 3 | 3 | 3 | 4 | 3 | 3 | 3 | 3 | 3 | 3 | 3 | 3 | 3 | 3 | 3 |
|---|---|---|---|---|---|---|---|---|---|---|---|---|---|---|---|---|
| 4 | 3 | 3 | 4 | 3 | 3 | 3 | 3 | 3 | 3 | 3 | 3 | 3 | 3 | 3 | 3 | 3 |
| 3 | 3 | 4 | 4 | 3 | 3 | 3 | 4 | 3 | 3 | 4 | 3 | 3 | 4 | 3 | 3 | 3 |
| 4 | 4 | 4 | 3 | 3 | 3 | 3 | 3 | 3 | 3 | 3 | 3 | 3 | 3 | 3 | 4 | 3 |
| 3 | 3 | 3 | 3 | 3 | 3 | 4 | 4 | 4 | 3 | 3 | 3 | 3 | 4 | 3 | 3 | 3 |
| 3 | 3 | 3 | 3 | 4 | 3 | 3 | 3 | 3 | 3 | 4 | 3 | 4 | 4 | 3 | 4 | 4 |
| 3 | 4 | 3 | 3 | 3 | 3 | 3 | 3 | 3 | 3 | 3 | 3 | 3 | 4 | 3 | 4 | 3 |
| 3 | 3 | 3 | 3 | 3 | 3 | 4 | 3 | 3 | 3 | 3 | 3 | 3 | 3 | 3 | 4 | 3 |
| 3 | 3 | 4 | 3 | 4 | 3 | 3 | 4 | 4 | 3 | 3 | 3 | 3 | 3 | 3 | 3 | 3 |
| 3 | 3 | 3 | 3 | 3 | 3 | 3 | 3 | 3 | 3 | 3 | 3 | 3 | 3 | 3 | 3 | 3 |
| 3 | 3 | 3 | 3 | 3 | 3 | 3 | 3 | 3 | 3 | 3 | 3 | 3 | 3 | 3 | 3 | 3 |
| 3 | 3 | 3 | 3 | 3 | 3 | 3 | 4 | 3 | 3 | 3 | 3 | 3 | 3 | 3 | 3 | 3 |
| 3 | 4 | 3 | 3 | 3 | 3 | 3 | 4 | 3 | 3 | 3 | 3 | 4 | 3 | 4 | 3 | 3 |
| 3 | 4 | 3 | 3 | 3 | 3 | 3 | 3 | 3 | 3 | 4 | 3 | 3 | 3 | 4 | 3 | 4 |
| 3 | 3 | 4 | 3 | 3 | 3 | 3 | 3 | 3 | 3 | 3 | 3 | 3 | 3 | 4 | 3 | 4 |
| 3 | 4 | 4 | 4 | 3 | 4 | 3 | 3 | 3 | 3 | 4 | 3 | 3 | 4 | 3 | 3 | 3 |
| 3 | 3 | 3 | 3 | 3 | 3 | 3 | 3 | 3 | 3 | 4 | 3 | 3 | 3 | 3 | 3 | 3 |
| 3 | 3 | 3 | 3 | 4 | 3 | 3 | 4 | 3 | 4 | 3 | 3 | 3 | 3 | 4 | 4 | 3 |

Fig.9

| 2 | 2 | 2 | 3 | 2 | 2 | 2 | 2 | 2 | 2 | 2 | 2 | 2 | 2 | 2 | 2 | 2 | 2 |
|---|---|---|---|---|---|---|---|---|---|---|---|---|---|---|---|---|---|
| 2 | 2 | 2 | 2 | 2 | 3 | 2 | 3 | 3 | 2 | 3 | 3 | 2 | 3 | 2 | 3 | 2 | 2 |
| 3 | 2 | 2 | 2 | 3 | 3 | 3 | 3 | 3 | 2 | 2 | 2 | 2 | 3 | 2 | 2 | 2 | 2 |
| 2 | 2 | 2 | 3 | 2 | 3 | 2 | 2 | 3 | 2 | 2 | 2 | 3 | 2 | 3 | 2 | 2 | 3 |
| 3 | 2 | 3 | 2 | 3 | 2 | 2 | 3 | 2 | 2 | 3 | 2 | 2 | 3 | 2 | 2 | 2 | 3 |
| 2 | 3 | 2 | 3 | 2 | 3 | 3 | 2 | 2 | 2 | 3 | 3 | 2 | 3 | 2 | 3 | 2 |   |
| 3 | 2 | 2 | 3 | 3 | 2 | 2 | 3 | 2 | 3 | 2 | 2 | 2 | 3 | 2 | 2 | 2 | 3 |
| 3 | 3 | 3 | 2 | 3 | 2 | 3 | 2 | 2 | 2 | 3 | 2 | 2 | 3 | 3 | 2 | 3 | 3 |
| 2 | 2 | 2 | 3 | 2 | 2 | 3 | 2 | 2 | 3 | 2 | 2 | 3 | 3 | 2 | 3 | 2 | 2 |
| 2 | 3 | 2 | 2 | 2 | 3 | 2 | 2 | 3 | 2 | 2 | 3 | 2 | 2 | 2 | 2 | 3 | 2 |
| 2 | 2 | 3 | 2 | 3 | 2 | 2 | 3 | 2 | 3 | 3 | 3 | 2 | 3 | 2 | 2 | 2 | 2 |
| 2 | 2 | 2 | 3 | 2 | 2 | 3 | 2 | 2 | 2 | 2 | 2 | 3 | 3 | 2 | 3 | 2 | 2 |
| 3 | 2 | 2 | 2 | 2 | 2 | 2 | 3 | 2 | 2 | 3 | 2 | 2 | 3 | 2 | 3 | 2 | 2 |
| 2 | 2 | 2 | 3 | 2 | 3 | 3 | 2 | 2 | 2 | 2 | 3 | 2 | 2 | 2 | 2 | 3 | 2 |
| 2 | 2 | 2 | 2 | 2 | 3 | 2 | 2 | 3 | 3 | 2 | 2 | 3 | 2 | 3 | 3 | 2 | 3 |
| 2 | 3 | 2 | 2 | 3 | 2 | 2 | 3 | 2 | 3 | 2 | 3 | 3 | 2 | 2 | 3 | 3 | 2 |
| 2 | 2 | 2 | 3 | 3 | 2 | 2 | 2 | 2 | 3 | 3 | 2 | 3 | 2 | 3 | 2 | 2 | 2 |
| 2 | 3 | 2 | 2 | 2 | 3 | 3 | 2 | 2 | 3 | 2 | 3 | 2 | 3 | 2 | 2 | 2 | 3 |

*Fig.10*

| 2 | 3 | 2 | 2 | 3 | 2 | 3 | 3 | 2 | 2 | 3 | 2 | 2 | 2 | 2 | 3 | 2 | 3 |
|---|---|---|---|---|---|---|---|---|---|---|---|---|---|---|---|---|---|
| 3 | 3 | 3 | 2 | 2 | 3 | 2 | 3 | 3 | 2 | 2 | 2 | 3 | 3 | 2 | 2 | 2 |
| 2 | 3 | 2 | 2 | 2 | 3 | 2 | 2 | 3 | 3 | 2 | 2 | 2 | 3 | 2 | 3 | 2 | 3 |
| 3 | 3 | 2 | 2 | 3 | 3 | 3 | 2 | 2 | 2 | 3 | 3 | 2 | 2 | 3 | 3 | 2 |
| 2 | 3 | 3 | 3 | 2 | 2 | 2 | 3 | 3 | 2 | 3 | 2 | 3 | 2 | 2 | 3 | 2 | 2 |
| 2 | 3 | 3 | 3 | 2 | 2 | 2 | 2 | 2 | 2 | 3 | 2 | 2 | 3 | 2 | 2 | 2 | 2 |
| 2 | 2 | 2 | 3 | 2 | 3 | 3 | 3 | 3 | 2 | 2 | 2 | 2 | 3 | 2 | 2 | 2 |
| 2 | 2 | 2 | 3 | 3 | 3 | 3 | 2 | 3 | 2 | 2 | 3 | 2 | 2 | 2 | 3 | 2 | 3 |
| 2 | 2 | 3 | 2 | 2 | 2 | 2 | 2 | 3 | 2 | 2 | 3 | 2 | 2 | 2 | 2 | 3 | 3 |
| 3 | 2 | 2 | 2 | 3 | 2 | 2 | 2 | 2 | 2 | 2 | 3 | 2 | 3 | 3 | 2 | 2 |
| 2 | 3 | 2 | 3 | 2 | 2 | 2 | 3 | 3 | 2 | 2 | 3 | 2 | 2 | 2 | 3 | 2 |
| 3 | 3 | 2 | 3 | 2 | 2 | 2 | 2 | 2 | 2 | 2 | 3 | 2 | 2 | 3 | 2 | 2 | 3 |
| 3 | 2 | 2 | 3 | 2 | 2 | 2 | 2 | 2 | 2 | 3 | 2 | 2 | 2 | 2 | 3 | 2 |
| 3 | 3 | 3 | 3 | 2 | 3 | 2 | 3 | 2 | 2 | 2 | 3 | 2 | 3 | 2 | 2 | 2 | 3 |
| 3 | 3 | 2 | 2 | 2 | 2 | 3 | 3 | 2 | 2 | 3 | 3 | 3 | 2 | 3 | 2 | 2 | 2 |
| 2 | 2 | 2 | 2 | 2 | 2 | 2 | 2 | 3 | 3 | 3 | 3 | 3 | 2 | 2 | 2 | 2 |
| 2 | 3 | 2 | 2 | 2 | 2 | 2 | 2 | 2 | 2 | 2 | 2 | 3 | 3 | 3 | 2 | 2 |
| 2 | 2 | 3 | 2 | 3 | 2 | 2 | 3 | 2 | 2 | 2 | 2 | 3 | 2 | 2 | 3 | 3 | 2 |

Fig.13

| VISUAL EVALUATION | COMPARATIVE EXAMPLE 1 | EXAMPLE 1 |
|---|---|---|
| WITH OPTICAL FILMS | △ | ○ |
| WITHOUT OPTICAL FILMS | × | △ |

○···ABSENCE OF NONUNIFORMITY OF LUMINANCE
△···SUBSTANTIAL REDUCTION IN NONUNIFORMITY OF LUMINANCE
×···PRESENCE OF NONUNIFORMITY OF LUMINANCE

LIGHT GUIDE PLATE, SURFACE LIGHT SOURCE DEVICE, AND TRANSMISSION IMAGE DISPLAY DEVICE

BACKGROUND OF THE INVENTION

1. Field of the Invention

The present invention relates to a light guide plate, a surface light source device, and a transmission image display device.

2. Related Background Art

A transmission image display device such as a liquid crystal display device generally has a surface light source device for supplying surface light using a light guide plate, as a backlight. Types of surface light source devices include a direct backlight type in which the light source is located on the back side of the light guide plate, and an edge light type in which the light source is located along a side face of the light guide plate. The edge light system is advantageous in terms of reduction in thickness of the image display device.

In the surface light source device of the edge light type, the light incident through the side face of the light guide plate is diffused by action of a light distribution pattern provided on the back side of the light guide plate (e.g., a light distribution pattern comprised of light scattering dots), and light components with angles of not less than the critical angle emerge from an exit surface of the light guide plate, thereby supplying the surface light. For making the luminance of its light emission surface uniform, the light guide plates described in Patent Literatures 1 and 2 below are provided with such gradation as to change the density of the light distribution pattern from coarse to dense with distance from the light source.

Patent Literature 1 also discloses a technique of forming the light distribution pattern of the dot pattern by ejection of liquid droplets (e.g., by ink jet printing).

Patent Literature 1: Japanese Patent Application Laid-open No. 2004-240294

Patent Literature 2: Japanese Patent Application Laid-open No. 2008-27609

SUMMARY OF THE INVENTION

However, when the dot gradation light distribution pattern was formed by ejection of liquid droplets, there was the problem that nonuniformity of luminance became prominent in an area where the density of the light distribution pattern was coarse as on the light entrance side near the light source.

It is therefore an object of the present invention to provide a light guide plate, a surface light source device, and a transmission image display device capable of reducing the nonuniformity of luminance on the light entrance side.

The inventors conducted elaborate research and then discovered that the nonuniformity of luminance occurred in an area where the contrast ratio by light scattering dots was not more than 50%, which was an area on the light entrance side near the light source, and further discovered that the nonuniformity of luminance could be reduced by arranging light scattering dots of two or more sizes in an irregular order in this area.

A light guide plate according to the present invention is therefore a light guide plate in which light scattering dots are formed on at least one surface of a light guide substrate; wherein a plurality of light scattering dots are formed in each individual area resulting from division of the at least one surface of the light guide substrate into a plurality of areas, and wherein in each individual area where a contrast ratio by the plurality of light scattering dots is not more than 50%, the plurality of light scattering dots comprise light scattering dots of two or more sizes and the light scattering dots of two or more sizes are arranged in an irregular order.

Since in this light guide plate the light scattering dots of two or more sizes are arranged in the irregular order in each individual area where the contrast ratio by the light scattering dots is not more than 50%, gradient variation by the light scattering dots is reduced on the light entrance side of the light guide plate. As a consequence, it is feasible to reduce the nonuniformity of luminance on the light entrance side of this light guide plate.

The foregoing contrast ratios in the plurality of areas are preferably those increasing with distance from a light entrance part. This configuration provides gradation to change the density of the light distribution pattern by the light scattering dots from coarse to dense with distance from the light source, so as to make the luminance of a light emission surface of the light guide plate uniform.

The aforementioned individual area is preferably a rectangular area from 1 mm to 10 mm. This configuration provides smoother gradation to change the density of the light distribution pattern by the light scattering dots from coarse to dense with distance from the light source, so as to make the luminance of the light emission surface of the light guide plate more uniform.

The aforementioned light scattering dots are preferably those printed by an ink jet method. This configuration makes it easier to arrange the light scattering dots of two or more sizes in the irregular order in the area where the contrast ratio by the light scattering dots is not more than 50%.

A surface light source device according to the present invention is a surface light source device of an edge light type comprising the aforementioned light guide plate, and a light source for supplying light to a side face of the light guide plate.

Since this surface light source device comprises the aforementioned light guide plate, the nonuniformity of luminance is reduced in the surface light source device of the edge light type.

A transmission image display device according to the present invention is one comprising the aforementioned surface light source device, and a transmission image display part arranged opposite to an exit surface of the surface light source device.

Since this transmission image display device comprises the surface light source device having the aforementioned light guide plate, the nonuniformity of luminance is reduced in the transmission image display device.

The present invention realizes reduction in nonuniformity of luminance on the light entrance side of the light guide plate. Furthermore, it also reduces the nonuniformity of luminance in the surface light source device of the edge light type using this light guide plate and in the transmission image display device using the surface light source device of the edge light type.

BRIEF DESCRIPTION OF THE DRAWINGS

FIG. 3 is a drawing showing an example of arrangement in an irregular order of light scattering dots of two sizes.

FIG. 4 is a drawing showing an example of arrangement in an irregular order of light scattering dots of two sizes.

FIG. 5 is a drawing showing an example of arrangement in an irregular order of light scattering dots of two sizes.

FIG. 6 is a drawing showing an example of arrangement in an irregular order of light scattering dots of two sizes.

FIG. 7 is a drawing showing an example of arrangement in an irregular order of light scattering dots of two sizes.

FIG. 8 is a drawing showing an example of arrangement in an irregular order of light scattering dots of two sizes.

FIG. 9 is a drawing showing an example of arrangement in an irregular order of light scattering dots of two sizes.

FIG. 10 is a drawing showing an example of arrangement in an irregular order of light scattering dots of two sizes.

FIG. 13 is a drawing showing the results of visual evaluation of nonuniformity of luminance in the light guide plates of the example and the comparative example.

DESCRIPTION OF THE PREFERRED EMBODIMENTS

Figure 1:
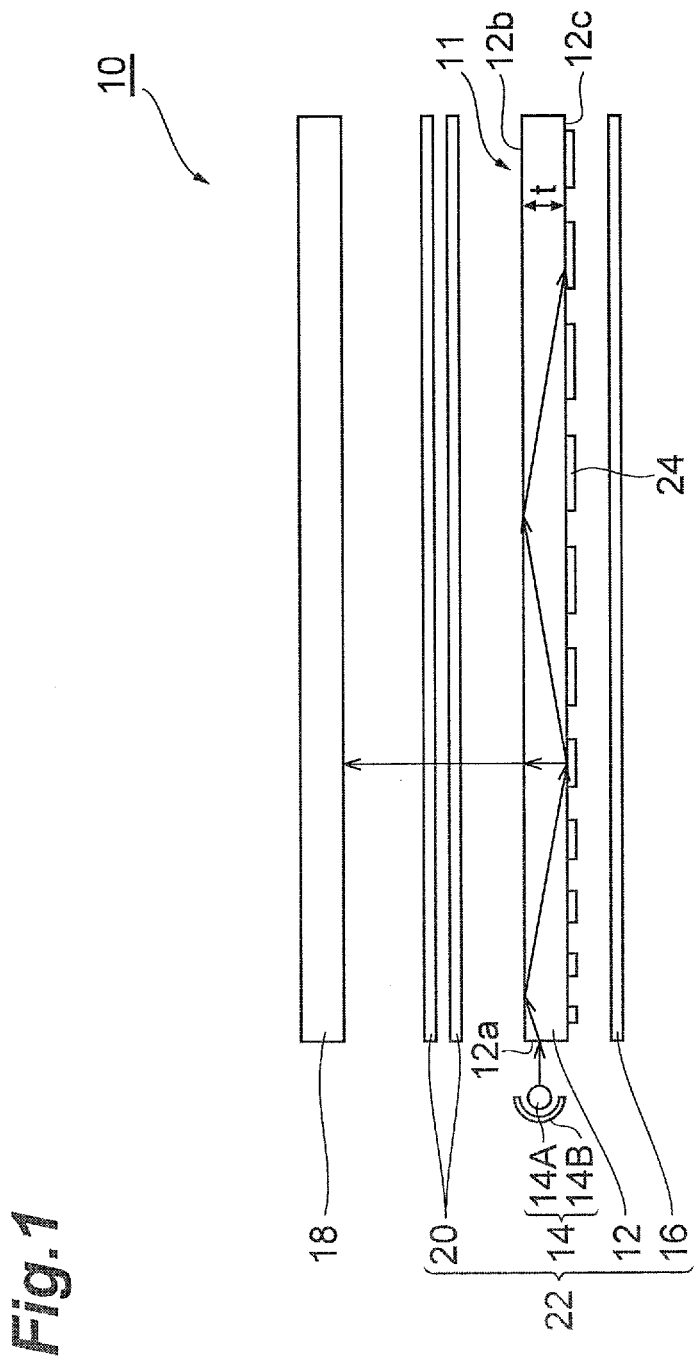
FIG. 1 is a schematic diagram showing a schematic configuration of a transmission image display device according to an embodiment of the present invention.

The preferred embodiments of the present invention will be described below in detail with reference to the drawings. In the drawings identical or equivalent portions will be denoted by the same reference signs.

FIG. 1 is a schematic diagram showing a schematic configuration of a transmission image display device according to an embodiment of the present invention. FIG. 1 shows an exploded view of the transmission image display device 10. This transmission image display device 10 is provided with a transmission image display part 18 and a surface light source device 22 arranged opposite to the transmission image display part 18.

The transmission image display part 18 is one that is illuminated with surface light emitted from the surface light source device 22 to display an image. An example of the transmission image display part 18 is a liquid crystal display panel as a polarizer laminate in which linearly polarizing plates are arranged on both sides of a liquid crystal cell. In this case, the transmission image display device 10 is a liquid crystal display device.

The surface light source device 22 is a surface light source device of the edge light type and is provided with a light guide plate 11, a light source part 14 arranged near a side face (light entrance) 12a of a light guide substrate 12 for the light guide plate 11, a reflective sheet 16 arranged on the back surface 12c side of the light guide substrate 12, and a plurality of optical films 20 arranged between an exit surface 12b of the light guide substrate 12 and the transmission image display part 18. Examples of the optical films 20 include diffusion films, prism films, and brightness enhancement films.

The light guide plate 11 has the light guide substrate 12 and a plurality of light scattering dots 24 provided on the back surface 12c of the light guide substrate 12. The light guide substrate 12 is a platelike body of a nearly rectangular shape on a plan view. An example of the thickness t of the light guide substrate 12, i.e., the distance between the exit surface 12b and the back surface 12c is about 3 mm, but it may be about 2 mm or about 4 mm. The light guide substrate 12 is comprised of an optically transparent material and the refractive index of the optically transparent material is normally from 1.46 to 1.62. Examples of the optically transparent material include optically transparent resin materials and optically transparent glass materials and examples of the optically transparent resin materials include acrylic resin, cycloolefin resin, polycarbonate resin, MS resin (methyl methacrylate-styrene copolymer resin), polystyrene resin, AS resin (acrylonitrile-styrene copolymer resin), and so on. A preferred one of the optically transparent resin materials is the acrylic resin in view of cost, high transparency, and low discoloration. A plurality of light scattering dots 24 for diffusion of light are formed on the back surface 12c of the light guide substrate 12.

In this light guide plate 11, the light emitted from the light source part 14 to enter the side face 12a of the light guide substrate 12 is diffused by action of the light scattering dots 24 provided on the back surface 12c of the light guide substrate 12 and light components with angles of not less than the critical angle emerge from the exit surface 12b of the light guide substrate 12, resulting in emission of surface light. The details of the light scattering dots 24 in the light guide plate 11 will be described later.

The light source part 14 has a light source 14A disposed along the side face 12a of the light guide substrate 12. The light source 14A may be comprised of point light sources such as light emitting diodes, halogen lamps, and tungsten lamps, or may be a linear light source such as a fluorescent lamp (cold cathode lamp). The light emitting diodes of the RGB type to emit red light, green light, and blue light are suitably applied.

The distance between the light source 14A and the side face 12a of the light guide substrate 12 is usually from 1 mm to 15 mm, preferably not more than 10 mm, and more preferably not more than 5 mm. When the light source is comprised of point light sources, the point light sources are linearly arrayed along the side face 12a. The spacing between adjacent point light sources is normally from 1 to 25 mm and is preferably not less than 10 mm so as to reduce the number of point light sources, in view of power saving.

The light source part 14 has a reflector 14B provided on the opposite side to the light guide plate 11 and serving as a reflecting portion to reflect light. The reflector 14B is formed, for example, of a white resin sheet or a white resin film.

When the light guide plate 11 is applied to the transmission image display device 10 of the present embodiment, the light guide plate 11 is set so that the back surface 12c of the light guide substrate 12 is opposed to the reflective sheet 16 and so that the exit surface 12b is located on the transmission image display part 18 side. In this configuration, the light emitted from the light source part 14 travels through the side face 12a into the light guide substrate 12. The light incident into the light guide substrate 12 propagates while being totally reflected in the light guide substrate 12. On this occasion, the light scattering dots 24 arranged in a predetermined dot pattern diffuse the light so as to emit the surface light from the exit surface 12b. If part of the light propagating in the light guide substrate 12 emerges from the back surface 12c to the outside, it is reflected by the reflective sheet 16 to be again incident into the light guide substrate 12. The surface light emitted from the exit surface 12b travels through the optical films 20 to illuminate the transmission image display part 18 and the transmission image display part 18 displays an image by making use of the illumination light.

Figure 2:
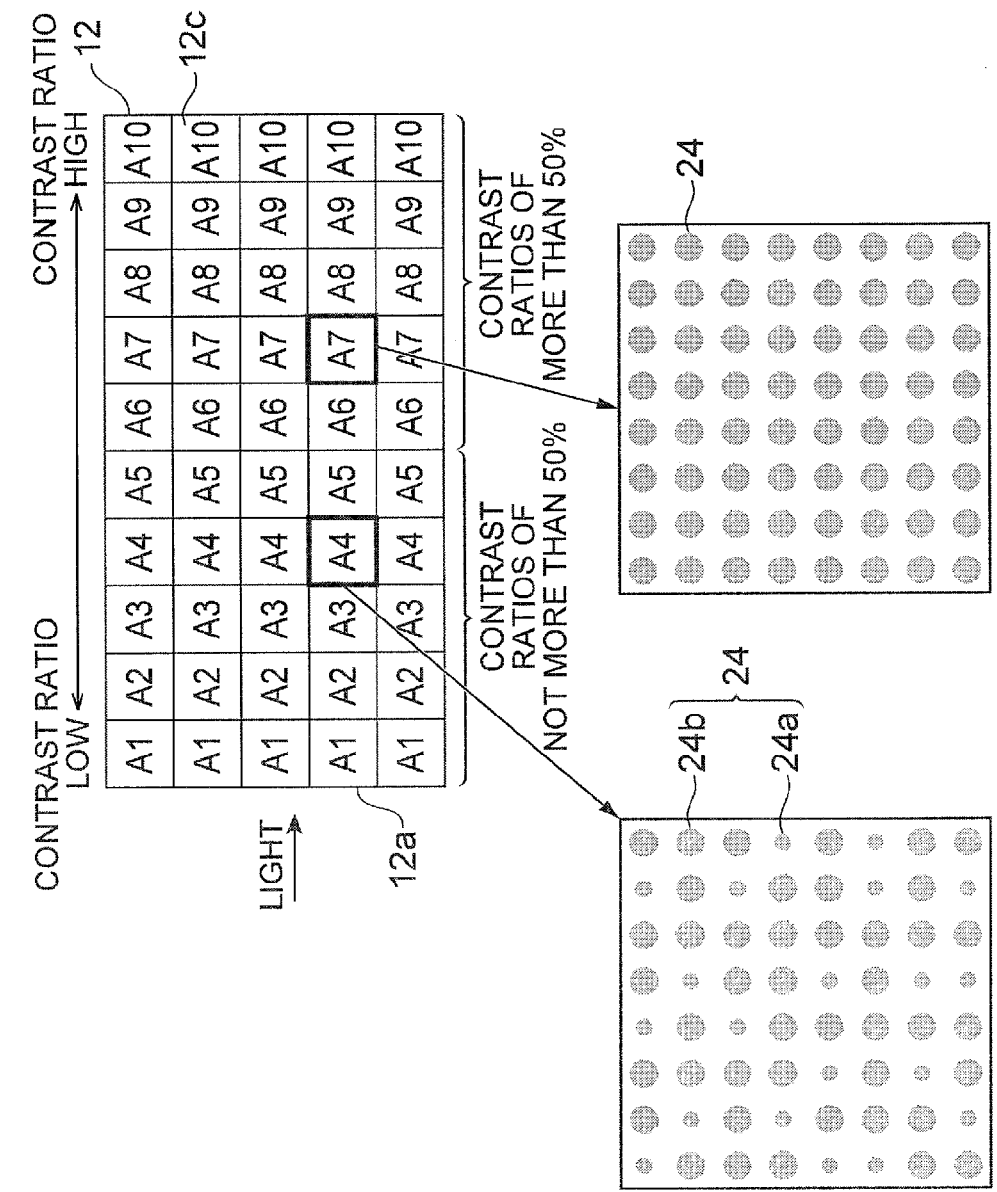
FIG. 2 is a plan view showing the back surface side of a light guide substrate in a light guide plate shown in FIG. 1, i.e., arrangement of light scattering dots.

The below will describe the light scattering dots 24 in the light guide plate 11. FIG. 2 is a plan view showing the back surface 12c side of the light guide substrate 12 in the light guide plate 11 shown in FIG. 1, i.e., the arrangement of light scattering dots 24.

In the present embodiment, the back surface 12c of the light guide substrate 12 is divided into a plurality of areas A1 to A10. A plurality of light scattering dots 24 are formed in each of the areas A1 to A10. The light scattering dots 24 are formed, for example, using white dots by ink jet printing.

In the areas A1 to A10, light is stronger in areas nearer to the light source part 14 or the side face (light entrance part) 12a of the light guide substrate 12, and light becomes weaker in areas more distant from the side face 12a. For this reason, the areas A1 to A10 are provided with such gradation as to increase the contrast ratio by the light scattering dots 24 in accordance with the distance from the side face (light entrance part) 12a so that the illuminance of light emitted from the exit surface 12b of the light guide substrate 12 becomes approximately uniform.

For making this gradation smooth, each of the areas A1 to A10 is a rectangular area from about 1 mm to 10 mm, preferably a rectangular area from about 1 mm to 5 mm, and more preferably a rectangular area from about 1 mm to 3 mm.

The light scattering dots 24 of one kind are arranged with a fixed center-to-center space in the areas A6 to A10 where the contrast ratio by the light scattering dots 24 is over 50%, which are areas becoming farther away from the side face 12a, out of the areas A1-A10. The size (area) of the light scattering dots 24 becomes larger in areas more distant from the side face 12a, white maintaining the fixed center-to-center space.

On the other hand, in the areas A1-A5 where the contrast ratio by the light scattering dots 24 is not more than 50%, substantially from 10% to 50%, which are areas near the side face 12a, the light scattering dots 24a, 24b of two sizes (areas) are arranged with the fixed center-to-center space and in an irregular order (or random order). The sizes of the light scattering dots 24a, 24b become larger in areas more distant from the side face 12a, while maintaining the fixed center-to-center space.

In the present embodiment the sizes of the light scattering dots 24a, 24b are determined, for example, by the number of drops of ink in the ink jet printing. On the other hand, the irregular order of the light scattering dots 24a, 24b is determined, for example, using random numbers. The below will describe some examples of arrays in irregular order of the light scattering dots 24a, 24b of two sizes determined by these determining methods.

FIRST EXAMPLE

Figure 3:
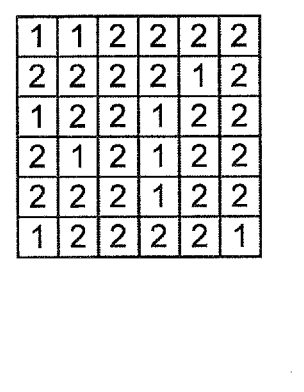

In the first example, 6×6 light scattering dots are arranged in an area about 1 mm square so that the contrast ratio by these light scattering dots becomes 10.8%. The sizes of the light scattering dots 24a, 24b of two kinds are the diameter of 52.5 µm by one drop of ink and the diameter of 65.0 µm by two drops of ink, respectively. FIGS. 3 and 4 show the results of irregular arrangements of these light scattering dots 24a, 24b, which were determined using random numbers. The numbers in the drawings indicate the numbers of drops of ink.

According to FIG. 3, while satisfying the contrast ratio of 10.8% as in the formula below, ten dots with the diameter of 52.5 µm by one drop of ink and twenty six dots with the diameter of 65.0 µm by two drops of ink are arranged in the irregular order.

$$((52.5/2)^2\pi \times 10 + (65.0/2)^2\pi \times 26)/1000^2 \times 100 = 10.8\%$$

According to FIG. 4 as well, while satisfying the contrast ratio of 10.8% as in the formula below, ten dots with the diameter of 52.5 µm by one drop of ink and twenty six dots with the diameter of 65.0 µm by two drops of ink are arranged in the irregular order.

$$((52.5/2)^2\pi \times 10 + (65.0/2)^2\pi \times 26)/1000^2 \times 100 = 10.8\%$$

SECOND EXAMPLE

In the second example, 6×6 light scattering dots are arranged in an area about 1 mm square so that the contrast ratio by these light scattering dots becomes 46.3%. The sizes of the light scattering dots 24a, 24b of two kinds are the diameter of 126.5 µm by six drops of ink and the diameter of 133.2 µm by seven drops of ink, respectively. FIGS. 5 and 6 show the results of irregular arrangements of these light scattering dots 24a, 24b, which were determined using random numbers.

According to FIG. 5, while satisfying the contrast ratio of 46.3% as in the formula below, twenty eight dots with the diameter of 126.5 µm by six drops of ink and eight dots with the diameter of 133.2 µm by seven drops of ink are arranged in the irregular order.

$$((126.5/2)^2\pi \times 28 + (133.2/2)^2\pi \times 8)/1000^2 \times 100 = 46.3\%$$

According to FIG. 6 as well, while satisfying the contrast ratio of 46.3% approximately as in the formula below, twenty nine dots with the diameter of 126.5 µm by six drops of ink and seven dots with the diameter of 133.2 µm by seven drops of ink are arranged in the irregular order.

$$((126.5/2)^2\pi \times 29 + (133.2/2)^2\pi \times 7)/1000^2 \times 100 = 46.2\%$$

THIRD EXAMPLE

In the third example, 18×18 light scattering dots are arranged in an area about 3 mm square so that the contrast ratio by these light scattering dots becomes 20.7%. The sizes of the light scattering dots 24a, 24b of two kinds are the diameter of 84.0 µm by three drops of ink and the diameter of 92.4 µm by four drops of ink, respectively. FIGS. 7 and 8 show the results of irregular arrangements of these light scattering dots 24a, 24b, which were determined using random numbers.

According to FIG. 7, while satisfying the contrast ratio of 20.7% as in the formula below, two hundred sixty nine dots with the diameter of 84.0 µm by three drops of ink and fifty five dots with the diameter of 92.4 µm by four drops of ink are arranged in the irregular order.

$$((84.012)^2\pi \times 269 + (92.4/2)^2\pi \times 55)/1000^2 \times 100 = 20.7\%$$

According to FIG. 8 as well, while satisfying the contrast ratio of 20.7% as in the formula below, two hundred sixty seven dots with the diameter of 84.0 µm by three drops of ink and fifty seven dots with the diameter of 92.4 µm by four drops of ink are arranged in the irregular order.

$$((84.0/2)^2\pi \times 267 + (92.4/2)^2\pi \times 57)/1000^2 \times 100 = 20.7\%$$

FOURTH EXAMPLE

In the fourth example, 18×18 light scattering dots are arranged in an area about 3 mm square so that the contrast ratio by these light scattering dots becomes 30.8%. The sizes of the light scattering dots 24a, 24b of two kinds are the diameter of 98.8 µm by two drops of ink and the diameter of 114.0 µm by three drops of ink, respectively. FIGS. 9 and 10 show the results of irregular arrangements of these light scattering dots 24*a*, 24*b*, which were determined using random numbers.

According to FIG. 9, while satisfying the contrast ratio of 30.8% as in the formula below, two hundred nine dots with the diameter of 98.8 μm by two drops of ink and one hundred fifteen dots with the diameter of 114.0 μm by three drops of ink are arranged in the irregular order.

$$((98.8/2)^2 \pi \times 209 + (114.0/2)^2 \pi \times 115)/1000^2 \times 100 = 30.8\%$$

According to FIG. 10 as well, while satisfying the contrast ratio of 30.8% approximately as in the formula below, two hundred eight dots with the diameter of 98.8 μm by two drops of ink and one hundred sixteen dots with the diameter of 114.0 μm by three drops of ink are arranged in the irregular order.

$$((98.8/2)^2 \pi \times 208 + (114.0/2)^2 \pi \times 116)/1000^2 \times 100 = 30.9\%$$

The degree of spread of ink on the light guide substrate 12 is greater in the fourth example than in the third example. In this manner, it is preferable to adjust the contrast ratio with consideration to the degree of spread of ink on the light guide substrate 12 as well.

Since in the light guide plate 11 of the present embodiment, as described above, the light scattering dots 24*a*, 24*b* having the two or more sizes are arranged in the irregular order in the areas A1-A5 where the contrast ratio by the light scattering dots 24 is not more than 50%, it is feasible to reduce gradient variation due to the light scattering dots 24*a*, 24*b* on the light entrance part 12*a* side of the light guide plate 11. As a result, it is feasible to reduce nonuniformity of luminance on the light entrance part 12*a* side of the light guide plate 11.

Since the surface light source device 22 of the present embodiment is provided with the foregoing light guide plate 11, it is feasible to reduce nonuniformity of luminance in the surface light source device 22 of the edge light type.

Since the transmission image display device 10 of the present embodiment is provided with the surface light source device 22 having the light guide plate 11 described above, it is feasible to reduce nonuniformity of luminance in the transmission image display device 10.

The present invention can be modified in many ways without having to be limited to the present embodiment described above. For example, the present embodiment showed the arrangement of the light scattering dots 24*a*, 24*b* of the two sizes in the irregular order in the areas A1-A5 where the contrast ratio by the light scattering dots was not more than 50%, which were the areas near the side face 12*a* of the light guide plate 11, but it is also possible to adopt a configuration wherein light scattering dots of three or more sizes are arranged in an irregular order.

The present embodiment showed the configuration wherein the center-to-center space of the light scattering dots was fixed by setting the number of drops of ink in the ink jet printing to not less than 1, but it is also possible to include no drop of ink. In this case, the center-to-center space of light scattering dots is not fixed (equal).

The present embodiment showed the configuration wherein the light source 14A was provided only on the side face 12*a* side, which is one of the four side faces of the light guide substrate 12, but it is also possible to adopt a configuration wherein light sources are provided along a pair of respective side faces opposed to each other in the light guide substrate 12. In this case, the light scattering dots of two or more sizes are arranged with a fixed center-to-center space and in an irregular order in the areas where the contrast ratio by the light scattering dots is not more than 50%, which are areas near the pair of side faces (light entrance parts).

It is a matter of course that light sources may be provided along all the four side faces of the light guide substrate 12. In this case, the light scattering dots of two or more sizes are arranged with a fixed center-to-center space and in an irregular order in the areas where the contrast ratio by the light scattering dots is not more than 50%, which are areas near the four side faces (light entrance parts).

The present embodiment showed the configuration wherein the sizes of the light scattering dots 24*a*, 24*b* were increased with distance from the side face (light entrance part) 12*a*, while maintaining the fixed center-to-center space, in the areas A1-A5 where the contrast ratio by the light scattering dots was not more than 50%, so as to keep the illuminance of light emitted from the exit surface 12*b* of the light guide substrate 12 approximately uniform, but how to implement the gradation of this kind is not limited to that in the present embodiment. For example, it can be contemplated that only one of the light scattering dots 24*a*, 24*b* is increased in size or that, without change in the sizes of the light scattering dots 24*a*, 24*b*, the number of smaller light scattering dots 24*a* is decreased while the number of larger light scattering dots 24*b* is increased by that degree.

The present invention does not have to be limited to the light scattering dots on the light entrance side of the light guide plate for the surface light source device of the edge light type, but the present invention is applicable to all applications requiring reduction in nonuniformity of luminance where incident light is strong and the contrast ratio by light scattering dots is low.

EXAMPLES

The light guide plate 11 according to the embodiment of the present invention shown in FIGS. 1 and 2 was produced as a trial product of Example 1 and was subjected to comparative evaluation with a light guide plate of Comparative Example 1. The light guide plates of Example 1 and Comparative Example 1 were prepared as described below.

Example 1

A PMMA molded product with the length of 922 mm, the width of 540 mm, and the thickness of 4 mm was used as the light guide substrate 12. Since there were masking films on the two surfaces of the light guide substrate 12, the masking film was peeled off from one surface and the exposed surface was wiped with a paper wipe impregnated with IPA to be cleaned. This exposed surface was defined as back surface 12*c* and the back surface 12*c* was printed with ink in the range 50 mm wide by ink jet printing.

Figure 11:
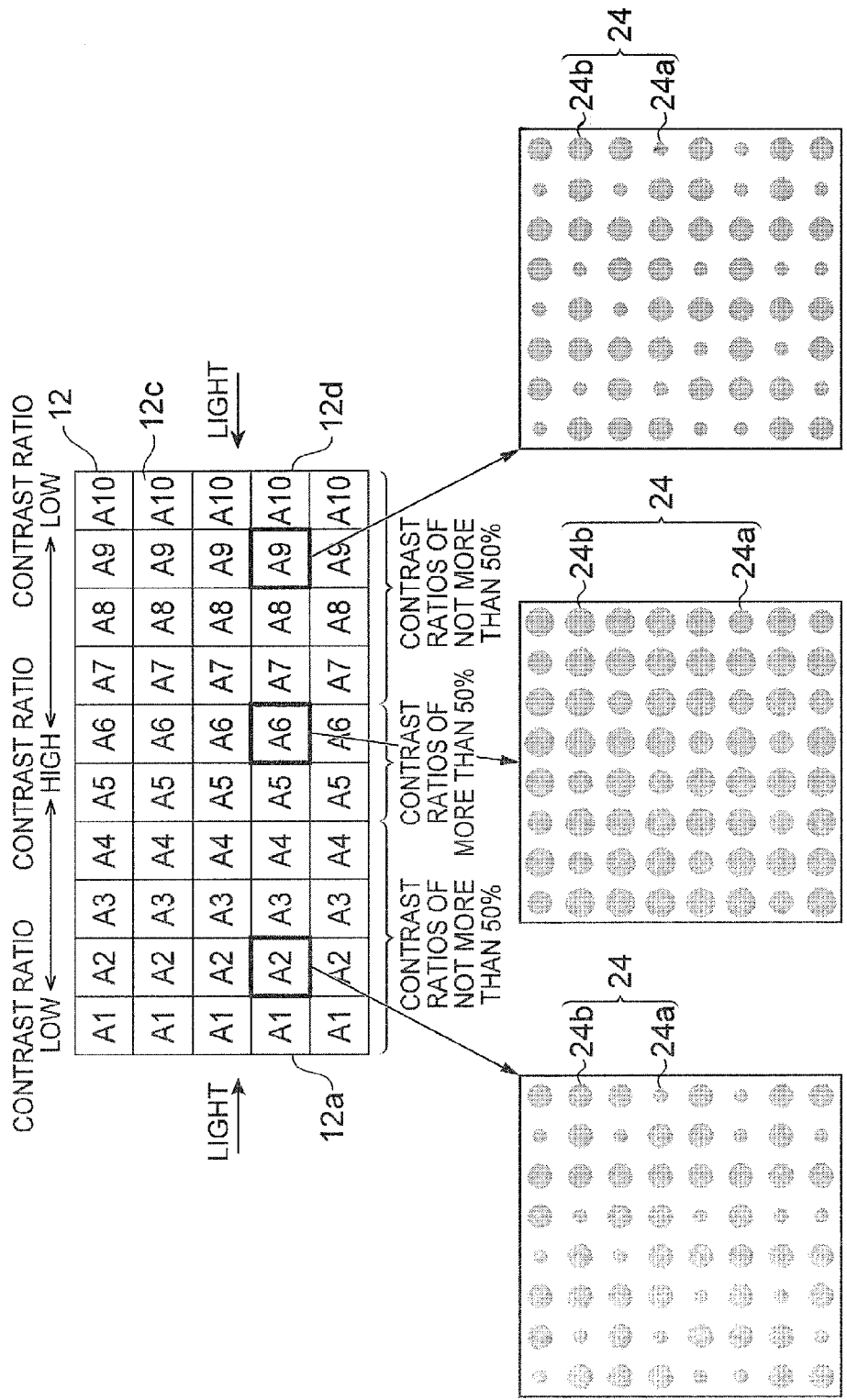
FIG. 11 is a plan view showing the back surface side of a light guide substrate in a light guide plate of an example, i.e., arrangement of light scattering dots.

The ink used was white ink comprised of titanium oxide and an ultraviolet curable resin. The conditions of an ink jet head for the ink jet printing were the resolution of 150 dpi, the printing width of 53.57 mm, and the scan speed of 200 mm/sec. The print pattern was 589 dots in the length direction and 300 dots in the width direction so as to achieve the gradation pattern shown in the embodiment of the present invention. In this Example 1 the pattern of the embodiment described above was modified as described below. Specifically, since a TV unit for evaluation described below had the structure with light sources on a pair of opposed side faces of the light guide substrate, the sizes of the light scattering dots were increased from the areas near the pair of side faces (light entrance parts) toward the central areas. For making the trial production of the print pattern easier, the light scattering dots of two sizes were also arranged with a fixed center-to-center space and in an irregular order in the areas where the contrast ratio by the light scattering dot was larger than 50%. Specifically, as shown in FIG. 11, the light scattering dots 24a, 24b of two sizes were arranged with the fixed center-to-center space and in the irregular order (random order) in the areas A1-A10. While keeping the fixed center-to-center space, the light scattering dots were arranged so as to increase the sizes of the light scattering dots 24a, 24b from the areas A1 on one side face 12a side out of the pair of side faces toward the central areas A5 and so as to increase the sizes of the light scattering dots 24a, 24b from the areas A10 on the other side face 12d side toward the central areas A6.

After the printing, the resin was cured with a UV lamp (metal halide lamp) of the irradiation intensity of 120 W/cm, so as to obtain Example 1 of the light guide plate 11 in which the gradation pattern by the light scattering dots shown in FIG. 2 was formed on the back surface 12c.

Comparative Example 1

Figure 12:
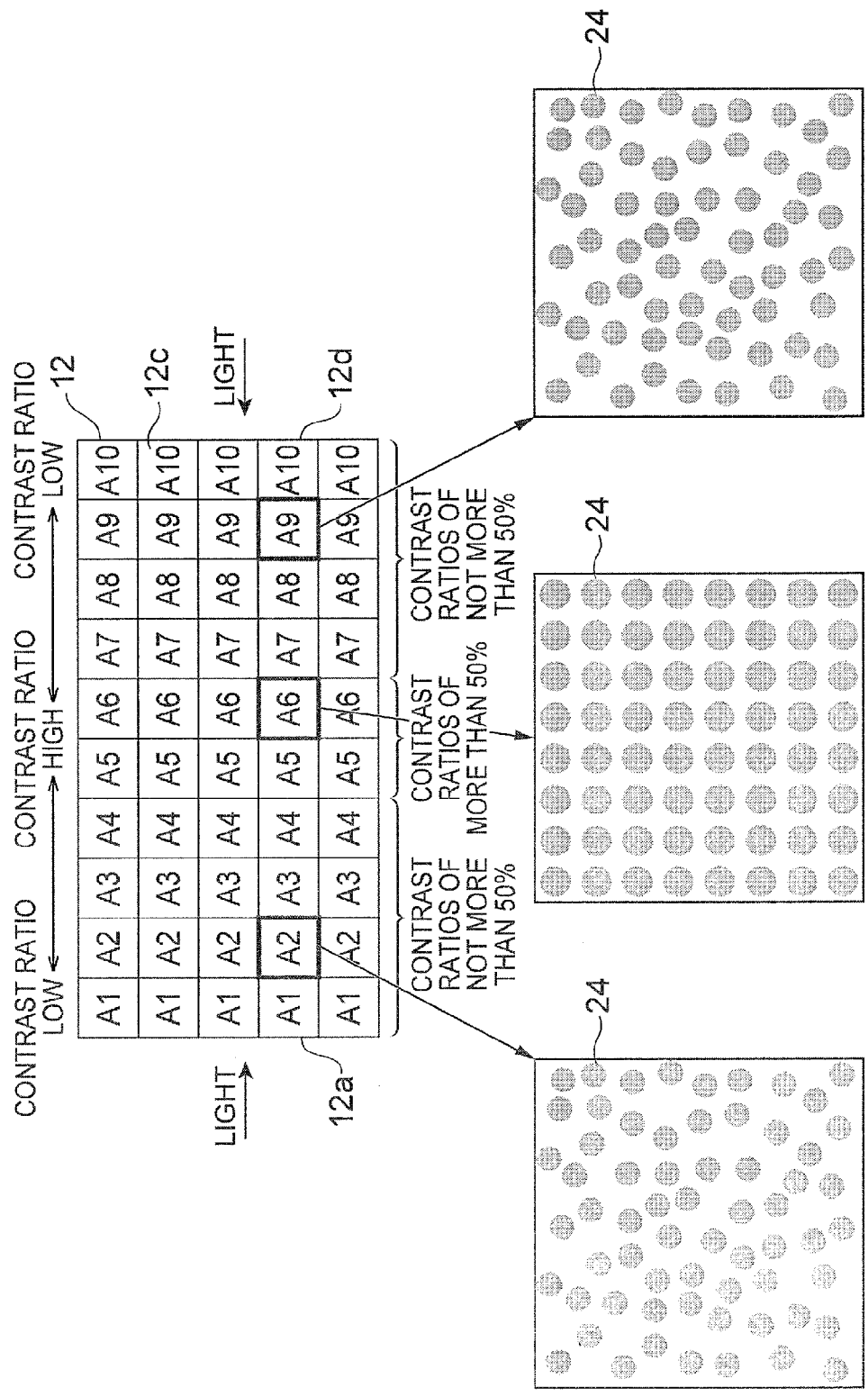
FIG. 12 is a plan view showing the back surface side of a light guide substrate in a light guide plate of a comparative example, i.e., arrangement of light scattering dots.

The light guide plate of Comparative Example 1 is a trial product in the process of elaborate research by the inventors. FIG. 12 is a plan view showing the back surface 12c side of the light guide substrate 12 in the light guide plate of Comparative Example 1, i.e., the arrangement of light scattering dots 24.

In Comparative Example 1, in order to solve the problem in the present specification, the light scattering dots 24 of one size were arranged with irregular center-to-center spaces or at irregular positions in areas A1-A4, A7-A10 where the contrast ratio by the light scattering dots was not more than 50%, which were areas near the pair of side faces (light entrance parts) 12a, 12d. In the areas A5-A6 where the contrast ratio by the light scattering dots was over 50%, the light scattering dots 24 of one kind were arranged with a fixed center-to-center space. The light scattering dots were arranged so as to increase the sizes of the light scattering dots 24 from the areas A1 on one side face 12a side of the pair of side faces toward the central areas A5 and so as to increase the sizes of the light scattering dots 24 from the areas A10 on the other side face 12d side toward the central areas A6. The light guide substrate 12, the ink, the conditions for ink jet printing, and others were the same as in Example 1.

In the present evaluation, each of the light guide plates of Example 1 and Comparative Example 1 was incorporated in place of the light guide plate of the TV unit (KDL-40EX manufactured by Sony Corporation) using LEDs as a light source. These TV units were turned on and nonuniformity of luminance distribution was visually evaluated in the range of 100 mm from the central part of the upper edge of TV. The evaluation results of this visual evaluation are shown in FIG. 13. FIG. 13 shows the evaluation results with and without the optical films (diffusion film, prism film, and brightness enhancement film) 20 on the surface of each light guide plate. In FIG. 13, "∘" represents the evaluation result of absence of nonuniformity of luminance, "Δ" the evaluation result of substantial reduction of nonuniformity with slight remaining nonuniformity of luminance by careful watch, and "x" the evaluation result of presence of nonuniformity of luminance.

According to the evaluation results, the improvement in nonuniformity of luminance was greater in Example 1 than in Comparative Example 1. The nonuniformity of luminance was almost perfectly improved by use of the optical films on the surface of the light guide plate.

Figure 14:
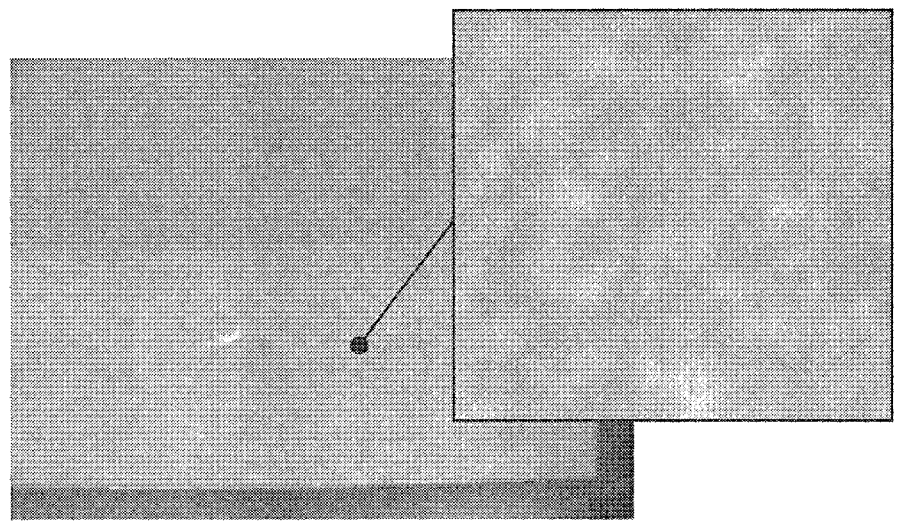
FIG. 14 is a drawing showing a photograph of an area near a light entrance part of the light guide plate of the example, and a drawing showing an enlarged view thereof.
Figure 15:
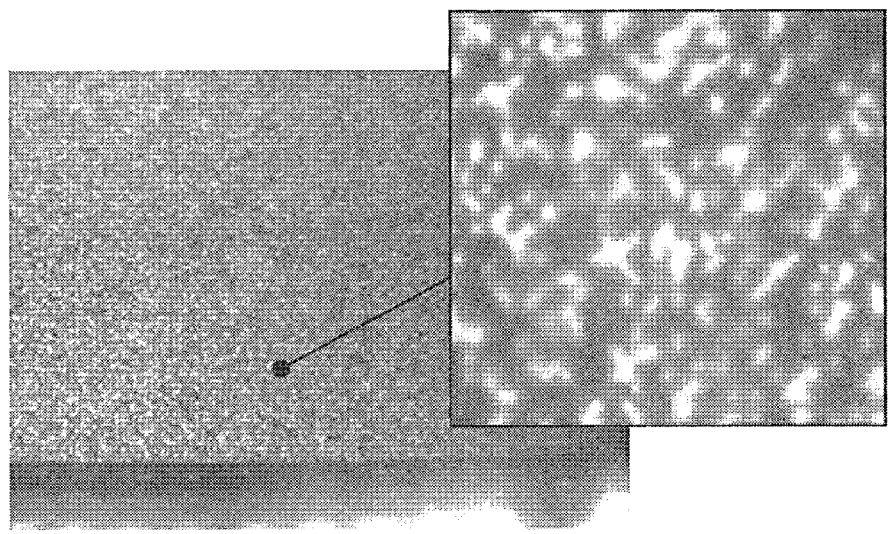
FIG. 15 is a drawing showing a photograph of an area near a light entrance part of the light guide plate of the comparative example, and a drawing showing an enlarged view thereof.

FIG. 14 (Example 1 with optical films) and FIG. 15 (Comparative Example 1) show photographs of a region with the contrast ratio of not more than 50% in the light entrance part of the light guide plates of Example 1 and Comparative Example 1, and enlarged views thereof. According to this result, nonuniformity of luminance appeared in the light entrance part, as shown in FIG. 15, in Comparative Example 1. On the other hand, nonuniformity of luminance was eliminated in the light entrance part, as shown in FIG. 14, in Example 1.

As verified above, the effect of reducing the nonuniformity of luminance was made greater by arranging the light scattering dots of two sizes in the irregular order or by decreasing the gradient variation due to the light scattering dots, in the areas where the contrast ratio by the light scattering dots was not more than 50%.

What is claimed is:
1. A surface light source device of an edge light type comprising: a light guide plate in which light scattering dots are formed on at least one surface of a light guide substrate,
    wherein a plurality of light scattering dots are formed in each individual area resulting from division of the at least one surface of the light guide substrate into a plurality of areas, and
    wherein in each individual area where a contrast ratio by the plurality of light scattering dots is not more than 50%, the plurality of light scattering dots comprise light scattering dots of two or more sizes and the light scattering dots of two or more sizes have a fixed center-to-center spacing, the sizes of which are arranged in an irregular order determined using random numbers; and a light source for supplying light to a side face of the light guide plate.
2. The surface light source device of an edge light type according to claim 1, wherein the contrast ratios in the plurality of areas increase with distance from a light entrance part.
3. The surface light source device of an edge light type according to claim 1, wherein each individual area is a rectangular area with a side of length 1 mm to 10 mm.
4. The surface light source device of an edge light type according to claim 1, wherein the light scattering dots are printed by an ink jet method.
5. A transmission image display device comprising:
    the surface light source device as set forth in claim 1; and
    a transmission image display part arranged opposite to an exit surface of the surface light source device.
6. The surface light source device of an edge light type according to claim 4, wherein the sizes of the light scattering dots are determined by the number of drops of ink in the ink jet printing.

* * * * *